United States Patent [19]
Madlener et al.

[11] Patent Number: 5,995,230
[45] Date of Patent: Nov. 30, 1999

[54] LASER LIGHT BARRIER SYSTEM FOR MEASURING TOOL AND WORK PIECES

[76] Inventors: Wolfgang Madlener, Koenigsberger Strasse 20, 88212 Ravensburg; Wilfried Veil, AM Langholz 11, 88285 Waldburg, both of Germany

[21] Appl. No.: 08/903,769

[22] Filed: Jul. 31, 1997

[30] Foreign Application Priority Data

Aug. 2, 1996 [DE] Germany .............. 196 31 306

[51] Int. Cl.⁶ .............. G01B 11/14; B23B 49/00
[52] U.S. Cl. .............. 356/375; 408/16; 356/72
[58] Field of Search .............. 356/72, 375; 408/1 R, 408/13, 16, 95, 98

[56] References Cited

U.S. PATENT DOCUMENTS

| | | | |
|---|---|---|---|
| 4,966,460 | 10/1990 | Kahley | ............... 356/387 |
| 5,021,632 | 6/1991 | Hauert | ............... 219/121.83 |
| 5,741,096 | 4/1998 | Olds | ............... 408/1 R |

FOREIGN PATENT DOCUMENTS

| | | |
|---|---|---|
| 29 10 882 | 10/1979 | Germany . |
| 32 31 158 | 11/1985 | Germany . |
| 234 710 | 4/1986 | Germany . |
| 35 26 633 | 2/1987 | Germany . |
| 37 39 607 | 12/1988 | Germany . |
| 38 11 551 | 10/1989 | Germany . |
| 274 867 | 1/1990 | Germany . |
| 38 33 680 | 1/1991 | Germany . |
| 36 20 898 | 5/1992 | Germany . |
| 40 13 792 | 11/1994 | Germany . |
| 295 14 892 U | 1/1996 | Germany . |

*Primary Examiner*—Robert H. Kim
*Assistant Examiner*—Michael P. Stafira
*Attorney, Agent, or Firm*—Venable; Gabor J. Kelemen

[57] ABSTRACT

A laser light barrier system for measuring or checking tools or workpieces on machine tools has a support which can be fastened to the machine frame. The support has an elongate base housing and two block housings, which at a mutual longitudinal distance project transversely from the elongate base housing and one of which contains a transmitter and one a receiver. The laser beam extends at a distance from and approximately parallel to the elongate base housing. An elongate stop element which is held in position by means of a latching arrangement, extends, in the space between the laser beam and the base housing, in the longitudinal direction from one block housing to the other block housing, and wherein the elongate stop element snaps off in the event of a collision with a moving tool or workpiece and, as a result, actuates an electric switch which, by acting on the emergency stop device of the machine stops the latter.

3 Claims, 2 Drawing Sheets

LASER LIGHT BARRIER SYSTEM FOR MEASURING TOOL AND WORK PIECES

BACKGROUND OF THE INVENTION

The invention relates to a laser light barrier system for measuring or checking tools or workpieces on machine tools. It includes a support housing which can be fastened to the machine frame and comprises an elongate base housing and two block housings, which at a mutual longitudinal distance project transversely from the base housing and one of which contains a transmitter and the other a receiver, the laser beam extending at a distance from and approximately parallel to the base housing. The laser beam may also have the form of a narrow ray bundle which is focused on the center of the beam path and then diverges. In this case, the axis of the ray bundle follows the same course as the abovementioned laser beam. Systems of this kind are used, for example, for setting rotating tools, for checking for tool breakage, for measuring the trajectory diameter of rapidly rotating tools and for length measurement, in particular for compensating for the thermal expansion of the measuring arbor.

Since all the important functioning parts are mounted on a common support, the system forms a structural unit which is ready for connection and can be used as an accessory to machines from a very wide variety of manufacturers and designs.

An important practical requirement of such a structural unit consists in protecting the sensitive transmitter and receiver components against the coolant spraying around in the machining space of a metal-working machine and against other environmental influences, but nevertheless allowing the laser beam an unimpeded opening for entry and exit. In the case of known systems, this is accomplished using blocking air and by means of mechanical closures for the opening.

The signal which is generated if the laser beam is interrupted usually acts directly on the NC system of the machine by stopping the feed as soon as the tool interrupts the laser beam. The reliability of this operating circuit is of particular importance, since otherwise there is a risk of damage to the machine and possibly of injury to the operator. However, since on the other hand, as mentioned, these systems are accessories not built in the factory, experience has shown that faults cannot be ruled out during adapting to the machine's own control system. The faults may arise on the laser light barrier system itself, in the signal processing (owing to computer errors) or as a result of incorrect programming, and therefore still constitute a considerable risk factor.

SUMMARY OF THE INVENTION

The object underlying the invention is to increase the reliability of the machine operation when using laser light barrier systems and to avoid damage to the tool, to the machine and to the laser components.

This object is achieved according to the invention by means of an additional electromechanical protection device which is independent of the programming. This is distinguished by the fact that an elongate stop element, which is held in position by means of a latching arrangement, extends, in the space between the laser beam and the base housing, in the longitudinal direction from one block housing to the other block housing, which stop element snaps off in the event of a collision with a moving tool or workpiece and that as a result actuates an electric switch which, by acting on the emergency stop device of the machine stops the latter.

The installation of such a protection device which is independent of the control system of the machine or of the machining center reduces the risk of damage quite considerably. Most important are those cases in which, in the event of incorrect programming of the machine, a collision is, as it were, preprogrammed. In this case, the invention provides an effective remedy.

The stop element is preferably a rod latched in at both its ends. Furthermore, the stop element may also be designed as a flat screen, which at least partially covers the support housing and is latched in at three points.

Expediently, the stop element has at least one latching recess at each of two opposite ends. A fixed pin engages in one latching recess and a pin which is mounted on the support housing such that it can move in its longitudinal direction and is subject to spring force engages in the other latching recess. The movable pin forms part of a contact arrangement, the electric circuit of which is closed in the latching position and is open in the unlatched position of the stop element. Naturally, the latching recesses and projections may also be arranged on the respectively opposite parts. However, the contact device needs to be integrated in the support housing, so that the associated connection wires can be led via the connection cable which is in any case present.

BRIEF DESCRIPTION OF THE DRAWINGS

An exemplary embodiment of the invention is explained below with reference to the drawing, in which.

DESCRIPTION OF THE PREFERRED EMBODIMENTS

Figure 1:
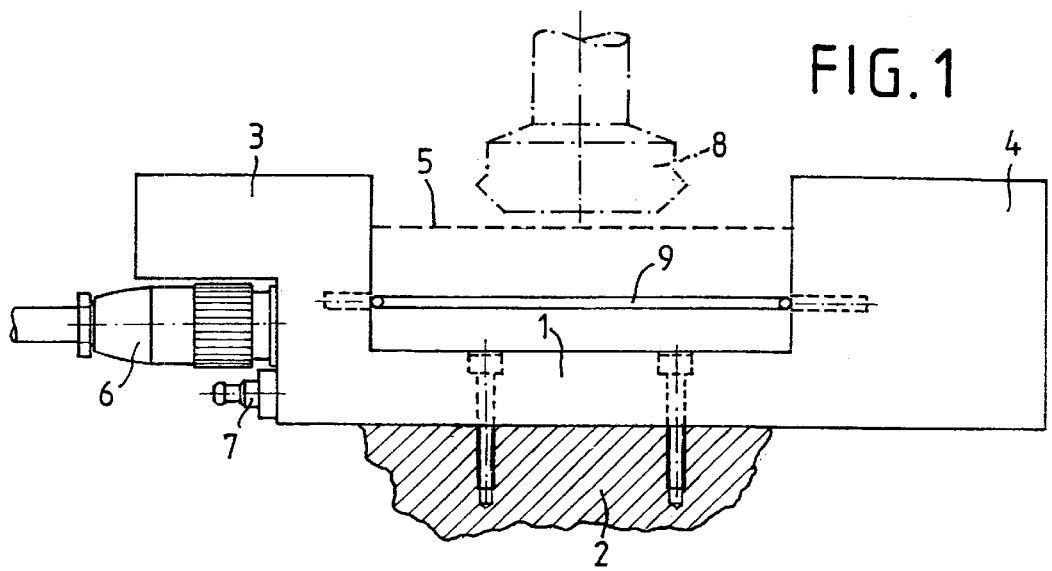
FIG. 1 shows a side view of a laser light barrier system in the supported version.
Figure 2:
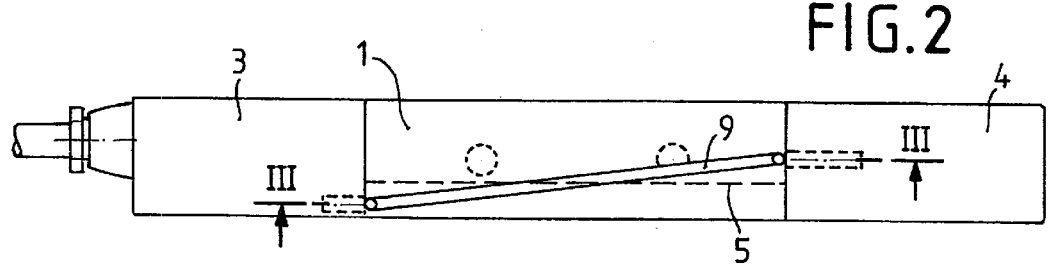
FIG. 2 shows a plan view of the support in accordance with FIG. 1.

The support in accordance with FIGS. 1 and 2 essentially comprises an elongate part, which is referred to as base housing 1 and is screwed onto a machine 2 by means of two screws. Two block housings 3 and 4 project at right angles from the base housing. One of these contains a laser beam transmitter and the other the associated laser beam receiver. The laser beam itself is indicated by a dashed line 5. The left-hand block housing 3 has a plug-in connector 6 for a multicore connection cable and also a compressed-air connection 7. Both of these components are covered at the top by the left-facing projection of the block housing 3.

The laser light barrier system illustrated serves, inter alia, for setting the length of the surface milling head 8 depicted in dot-dashed lines in FIG. 1. This head is moved downwards in the axial direction until it interrupts the laser beam 5. In the event of incorrect programming of the moving arbor of the system, this tool would continue on its path and collide with the base housing 1.

To avoid this, a stop rod 9 is clamped in between the two block housings 3 and 4, which rod, in the event of contact with the surface milling head 8, is forced out of its latchings. This opens an electric contact which is connected into the emergency stop control circuit of the machine and thus immediately stops the latter.

Figure 3:
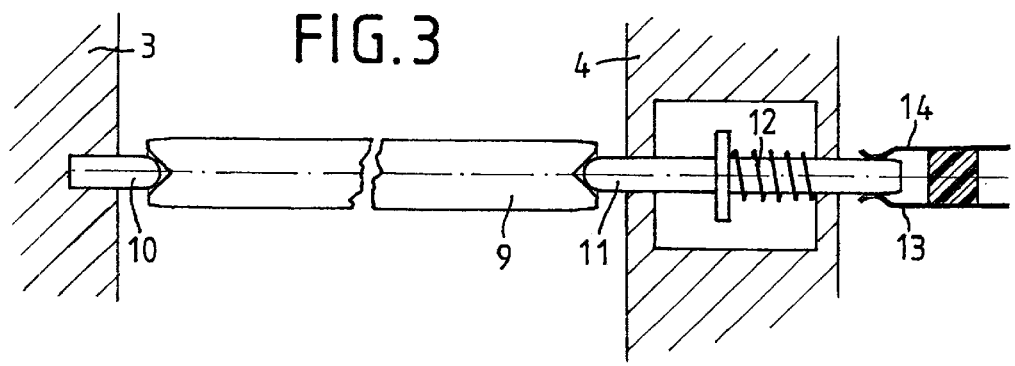
FIG. 3 shows a diagrammatic vertical section III—III of the latching devices of a stop rod on an enlarged scale.

FIG. 3 shows in detail, by way of example, the arrangements involved in this. The left-hand side of the figure illustrates a pin 10, which is fixedly inserted in the wall of the block housing 3, perpendicular to the surface thereof. By contrast, a pin 11 on the right-hand side is mounted displaceably in the block housing 4 and is subject to the action of a spring 12, which is pressing it outwards from the housing. However, this pin 11 extends rearward beyond the spring, where it engages between two isolated contact springs 13 and 14. These two contact springs are consequently electrically connected. The two pins 10 and 11 are spherically rounded at their front ends and engage in conical countersunk recesses at the ends of the stop rod 9. If this stop rod 9 is pressed out of the latch at one or both ends, the result is that the right-hand pin 11 is withdrawn from the contact springs 13 and 14, thus opening the switch formed in this way and stopping the machine tool before any damage occurs.

Figure 4:
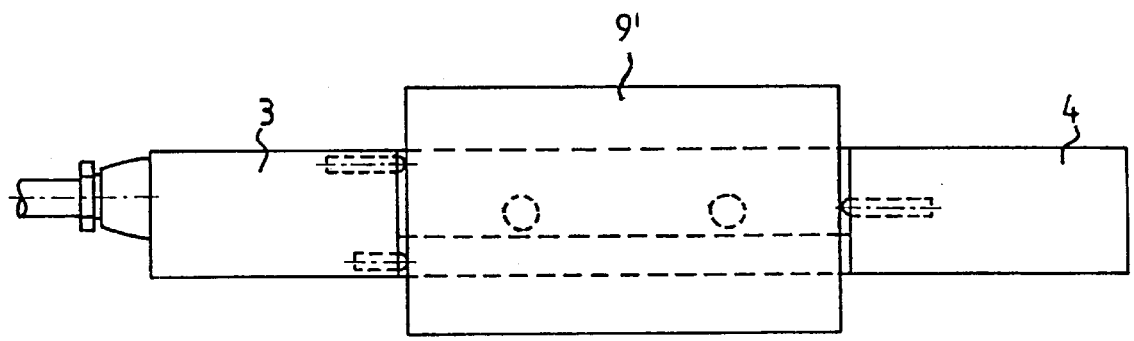
FIG. 4 is a plan view of the support as show in FIG. 2, holding a flat stop element.

If a rather more flat stop element is selected instead of the stop rod 9, it is recommended to hold it in position at at least three latching points, of which more than one is electrically active, i.e. equipped with a switch. Such flat stop elements may also be arranged at the side faces of the support or over other surfaces which are at risk. Thus, according to FIG. 4 the flat stop element is a flat screen 9' which covers a portion of the support and is latched in at there points.

We claim:

1. A laser light barrier system for measuring or checking tools or workpieces on machine tools, having a support which can be fastened to the machine frame; said support comprising an elongate base housing and two block housings, which at a mutual longitudinal distance project transversely from the elongate base housing and one of which contains a transmitter and one a receiver, the laser beam extending at a distance from and approximately parallel to the elongate base housing, wherein an elongate stop element which is held in position by means of a latching arrangement, extends, in the space between the laser beam and the base housing, in the longitudinal direction from one block housing to the other block housing, and wherein the elongate stop element snaps off in the event of a collision with a moving tool or workpiece and as a result actuates an electric switch which, by acting on the emergency stop device of the machine stops the latter.

2. The laser light barrier system as claimed in claim 1, wherein the elongate stop element is a rod which is latched in at both its ends.

3. The laser light barrier system as claimed in claim 1, wherein the elongate stop element is a flat screen, which at least partially covers the support housing, and is latched in at three points.

* * * * *